US012617328B2

(12) United States Patent
Peterson et al.

(10) Patent No.: US 12,617,328 B2
(45) Date of Patent: May 5, 2026

(54) LOADING RAMP FOR UTILITY VANS

(71) Applicant: National Fleet Products, Inc., Buffalo, MN (US)

(72) Inventors: Steven Peterson, Wayzata, MN (US); Samuel Johnson, Orono, MN (US); Gilbert Daniel Bodimer, St. Cloud, MN (US)

(73) Assignee: National Fleet Products, Inc., Buffalo, MN (US)

( * ) Notice: Subject to any disclaimer, the term of this patent is extended or adjusted under 35 U.S.C. 154(b) by 727 days.

(21) Appl. No.: 17/985,658

(22) Filed: Nov. 11, 2022

(65) Prior Publication Data

US 2023/0150413 A1     May 18, 2023

Related U.S. Application Data

(60) Provisional application No. 63/279,008, filed on Nov. 12, 2021.

(51) Int. Cl.
*B60P 1/43* (2006.01)
*B65G 69/28* (2006.01)

(52) U.S. Cl.
CPC .............. *B60P 1/431* (2013.01); *B65G 69/28* (2013.01)

(58) Field of Classification Search
CPC .. B60P 1/43; B60P 1/433; B60P 1/431; B65G 69/28; B65G 69/2811; A61G 3/06; A61G 3/061

USPC ................................................ 14/69.9, 71.1
See application file for complete search history.

(56) References Cited

U.S. PATENT DOCUMENTS

| | | | | | |
|---|---|---|---|---|---|
| 5,832,555 A | * | 11/1998 | Saucier | ................... | B60P 1/431 |
| | | | | | 14/71.1 |
| 6,484,344 B1 | * | 11/2002 | Cooper | ................... | A61G 3/061 |
| | | | | | 14/71.1 |
| 7,121,603 B2 | * | 10/2006 | Stevenson | ............... | B60P 1/003 |
| | | | | | 296/37.6 |
| 9,796,264 B2 | * | 10/2017 | Brault | ........................ | F02K 3/06 |
| 2012/0030886 A1 | * | 2/2012 | Persson | .................... | B60R 3/02 |
| | | | | | 14/71.1 |
| 2012/0233787 A1 | * | 9/2012 | Couto | ..................... | B60P 1/431 |
| | | | | | 14/71.1 |
| 2019/0247248 A1 | * | 8/2019 | Perkins | ................... | B60P 1/431 |

FOREIGN PATENT DOCUMENTS

| | | | | |
|---|---|---|---|---|
| CA | 3059138 A1 | * | 4/2020 | .............. B60P 1/435 |

* cited by examiner

*Primary Examiner* — William V Gilbert
(74) *Attorney, Agent, or Firm* — Skaar Ulbrich Macari, P.A.

(57)     ABSTRACT

A loading ramp assembly for utility vans can include a main deck with side rails fastened to the longitudinal sides of the main deck. A raised loading floor of the utility van is disposed atop a pair of guide rails. Guide wheels on the side rails move through guide rails secured to the van's original floor as the ramp is retracted and deployed. The ramp can be fully retracted and stored inside of the van such that the rear doors of the van can be closed normally without the need to remove the loading ramp assembly from the van.

20 Claims, 21 Drawing Sheets

108    134

124

124    108

136    142

128                                                                        128

140      134                                  136        140

102

108

104

134

102

136

104

104

110

102
112
104
116A
116B 108
122
120

LOADING RAMP FOR UTILITY VANS

PRIORITY

This application claims priority under 35 U.S.C. § 119(e) to, and hereby incorporates by reference in its entirety, U.S. Provisional Application No. 63/279,008, filed Nov. 12, 2021.

FIELD

The present invention relates to vehicle accessories, and more particularly, to a loading ramp system for vans.

BACKGROUND

It is increasingly popular to employ utility vans, such as the Ford Transit, Ram Promaster, Mercedes Benz Sprinter and others, for cargo, utility, passenger and recreational vehicle purposes. However, it is inconvenient and some-times difficult for persons to load machinery into these types of vans due to their relatively high step-in/out height. For example, a commercial lawn-mowing device would be difficult to load into these types of vans.

It is known to mount detachable ramps or runners to facilitate loading. However, such ramps or runners need to be stored separately and are often inconvenient to use. Moreover, the width of such ramps does not span the entire distance between the rear loading doors of the van. Thus, there is a continuing need to provide an improved, easy-to-use loading ramp system for utility vans.

SUMMARY

Provided is a loading ramp assembly for utility vans. The loading ramp assembly can include a main deck with side rails fastened to the longitudinal sides of the main deck. A raised loading floor of the utility van is disposed atop a pair of guide rails. Guide wheels on the side rails move through guide rails secured to the van's original floor as the ramp is retracted and deployed. The ramp can be fully retracted and stored inside of the van such that the rear doors of the van can be closed normally without the need to remove the loading ramp assembly from the van.

In one example disclosed herein a loading ramp assembly for a utility van includes a main deck, a pair of side rails and a pair of guide rails. The main deck comprises a longitudinally elongated surface having a distal end, an opposing proximal end, and a pair of opposing longitudinal sides spanning between the proximal end and the distal end. The pair of side rails are oriented parallel to one another and each is coupled to a respective one of the pair of opposing longitudinal sides of the main deck. Each side rail has a proximal longitudinal end and a distal longitudinal end. A pair of guide wheels can be coupled to a respective one of the pair or side rails adjacent to the proximal end thereof. Each guide wheel extends laterally outwardly from the respective one of the pair or side rails to which each of the pair of guide wheels is coupled. Each of the pair of guide rails is oriented parallel to one another and parallel to the pair of side rails. Each of the pair of guide rails defines a channel with an opening in one longitudinal side of the guide rail. The channel spans between a proximal end thereof and a distal end of each guide rail. Each of the pair of guide rails is disposed adjacent to a respective one of the pair of side rails such that the channel faces towards the respective side rail. The channel is shaped and sized to be disposed within the channel and travel proximally and distally within the respective guide rail.

A first bracket can be fastened to one of the pair of guide rails adjacent to a distal end thereof. A second bracket can be fastened to the other one of the pair of guide rails adjacent to the distal end thereof. Each of the first bracket and the second bracket can include a longitudinally inward extending portion that includes a sliding pad positioned to allow a bottom surface of a respective one of the pair of side rails to slide atop the sliding pad when the pair of guide wheels move proximally and distally within the channels of the pair of guide rails.

The first bracket and the second bracket can each include a laterally outwardly extending flange that defines a first plurality of apertures therethrough. Each of the first plurality of apertures can define an arcuate channel. The first bracket and the second bracket can each further comprise a laterally outwardly extending mounting portion with a second plurality of apertures defined therethrough such that a mechanical fastener can be inserted simultaneously through one of the first plurality of apertures and one of the second plurality of apertures.

The main deck can be planar and define a plurality of raised ribs that are oriented perpendicular to a longitudinal axis of the main deck. The main deck can include an aperture through the main deck that is located adjacent to the distal end thereof to facilitate grasping with a hand of a user. The main deck can be a solid surface or the main deck can be formed from a plurality of separate segments that are joined together to define a continuous upper top deck surface. The main deck can include a plurality of reinforcement ribs extending downward from a lower surface thereof.

An elevated loading floor can be disposed atop the pair of guide rails. The elevated loading floor can span longitudinally from the distal end of the pair of guide rails to the proximal end of the guide rails, and laterally between the pair of guide rails.

A transition deck portion can be coupled to the proximal end of the main deck, the transition deck portion extending proximally from the main deck sufficiently to bridge a gap between the proximal end of the main deck and a distal end of the elevated loading floor when the main deck is in a deployed state. The transition deck portion can be curved.

Each sliding pad can be formed of a plastic material.

A distal travel stop bracket can be disposed over each of the distal ends of each of the pair of guide rails. Each distal travel stop bracket can be configured to prevent a respective one of the pair of guide wheels from exiting the channel of the respective guide rail from a distal end thereof.

A third bracket can be fastened to one of the pair of guide rails and located adjacent to a proximal end thereof. The third bracket can include a first L-shaped portion that is fastened to the guide rail and a second L-shaped portion that extends laterally outward from the first L-shaped portion. The second L-shaped portion presents a securing surface that is oriented parallel to a longitudinal axis of the guide rail to which the third bracket is fastened. Other additional brackets can also be provided as explained herein below.

The above summary is not intended to limit the scope of the invention, or describe each embodiment, aspect, implementation, feature or advantage of the invention. The detailed technology and preferred embodiments for the subject invention are described in the following paragraphs and the accompanying appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

DETAILED DESCRIPTION

Figures 1, 2:
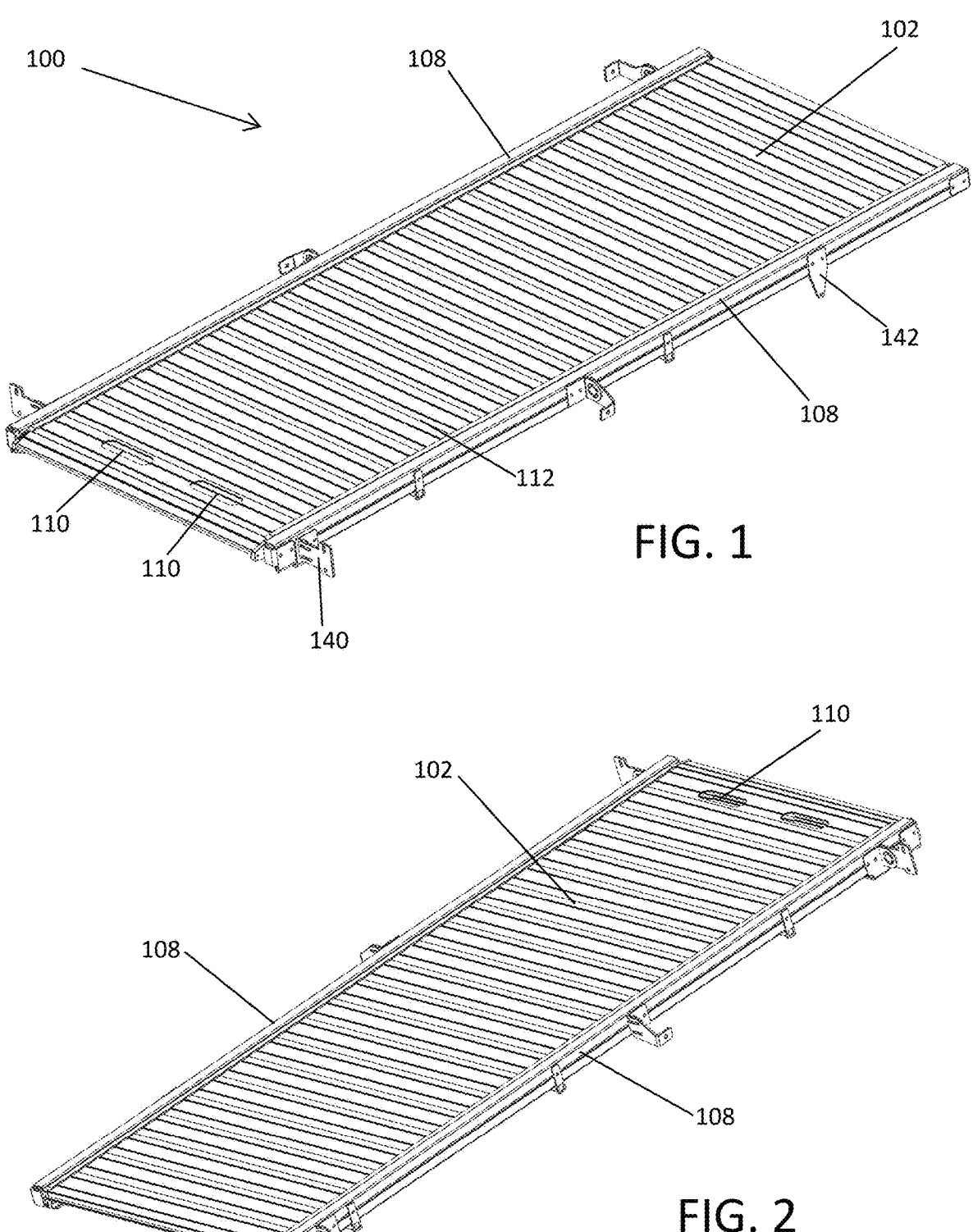
FIG. 1 is a perspective view of a loading ramp for a van in a stowed state in accordance with certain aspects of the invention.
FIG. 2 is another perspective view of a loading ramp for a van in a stowed state in accordance with certain aspects of the invention.
Figure 3:
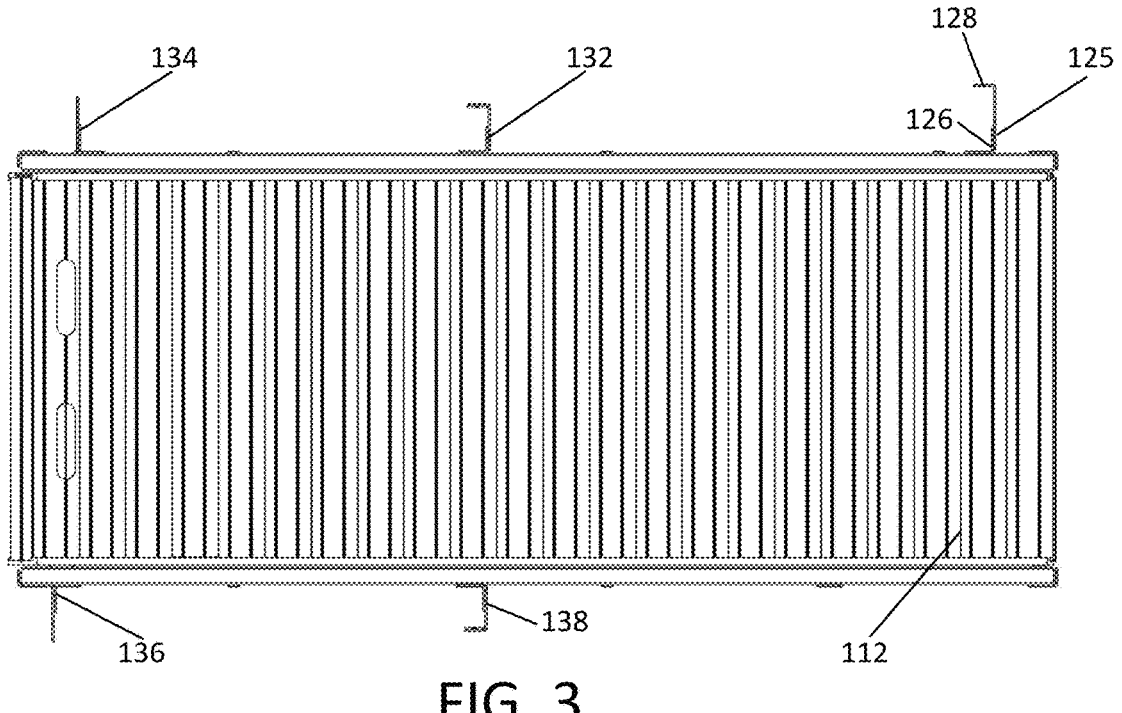
FIG. 3 is a top view of a loading ramp for a van in a stowed state in accordance with certain aspects of the invention.
Figure 4:
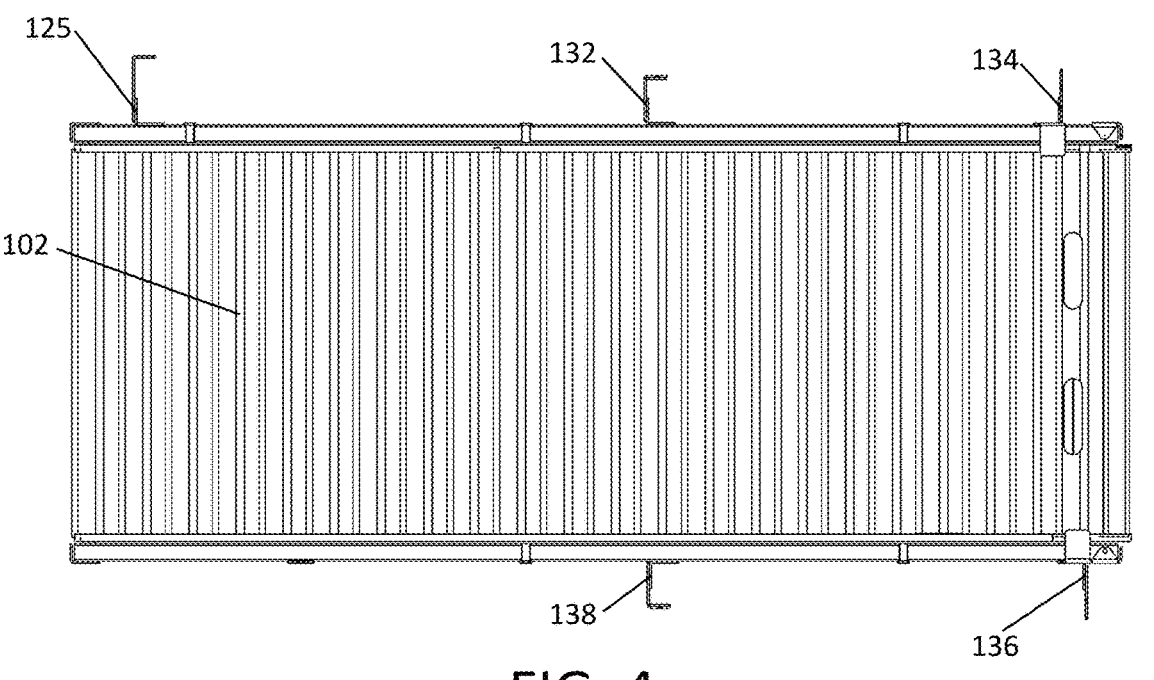
FIG. 4 is a bottom view of a loading ramp for a van in a stowed state in accordance with certain aspects of the invention.
Figure 5:
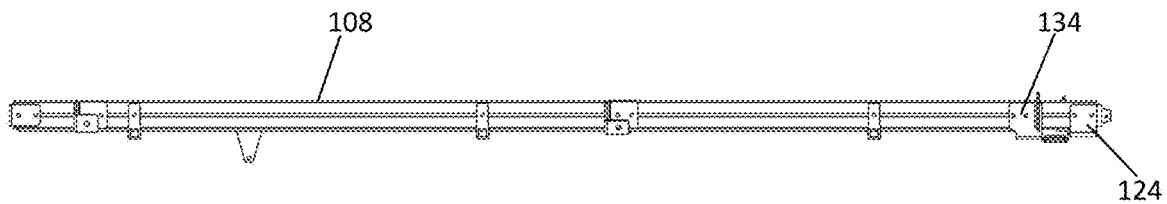
FIG. 5 is a side view of a loading ramp for a van in a stowed state in accordance with certain aspects of the invention.
Figure 6:
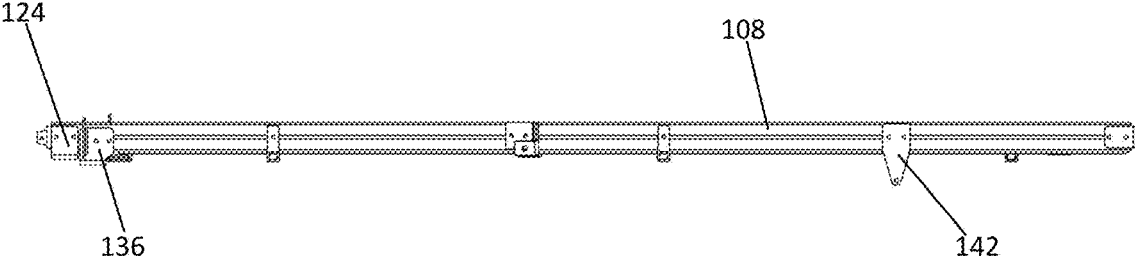
FIG. 6 is a second side view, opposite that of FIG. 5, of a loading ramp for a van in a stowed state in accordance with certain aspects of the invention.
Figure 7:
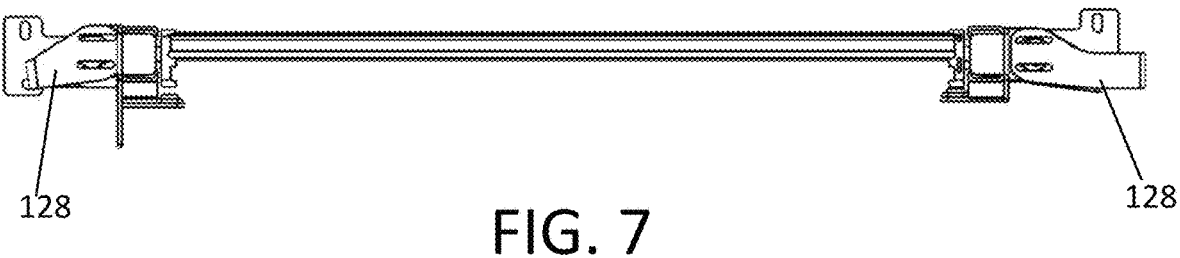
FIG. 7 is an end view of a loading ramp for a van in a stowed state in accordance with certain aspects of the invention.
Figure 8:
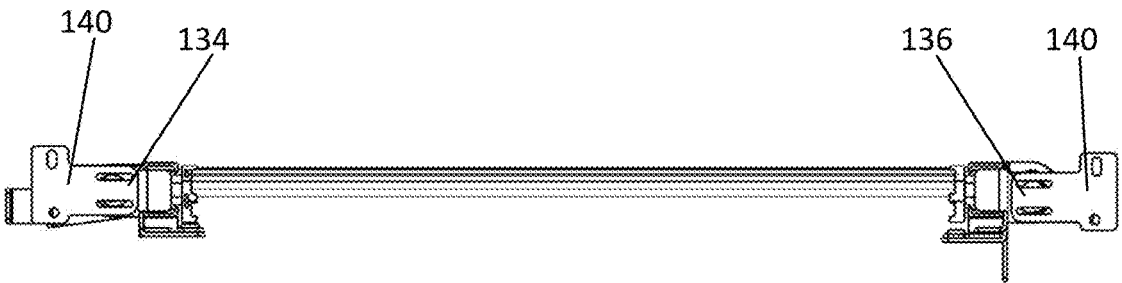
FIG. 8 is a second end view, opposite that of FIG. 7, of a loading ramp for a van in a stowed state in accordance with certain aspects of the invention.
Figure 9:
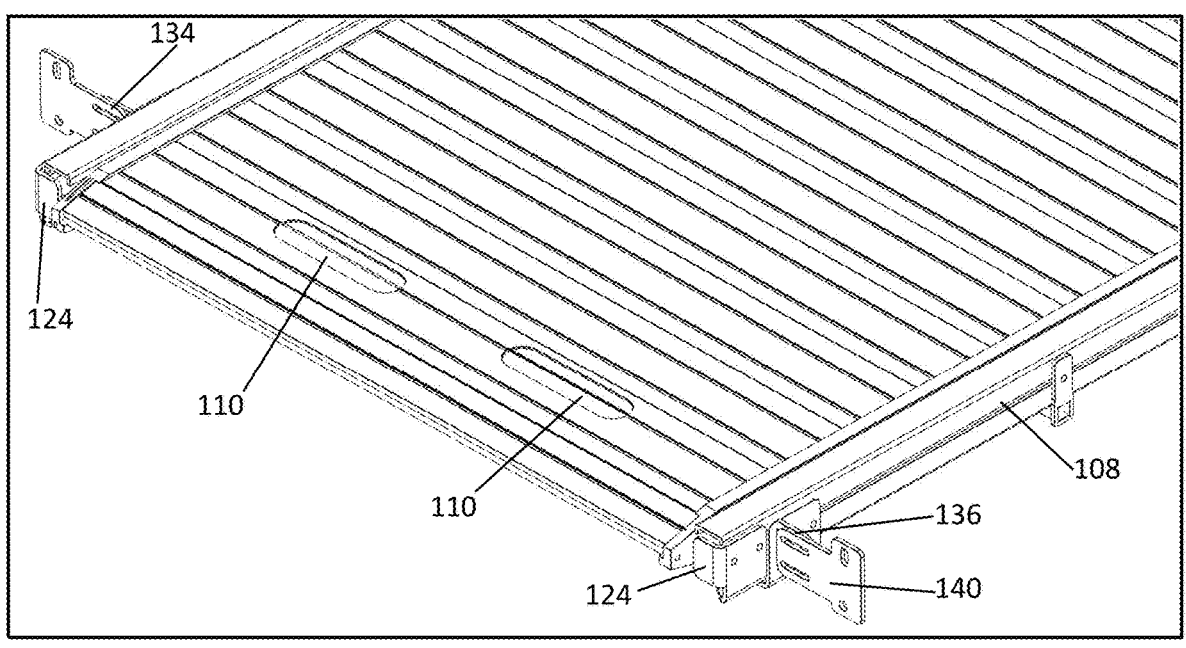
FIG. 9 is a close-up partial perspective view of a loading ramp for a van in a stowed state in accordance with certain aspects of the invention.
Figure 10:
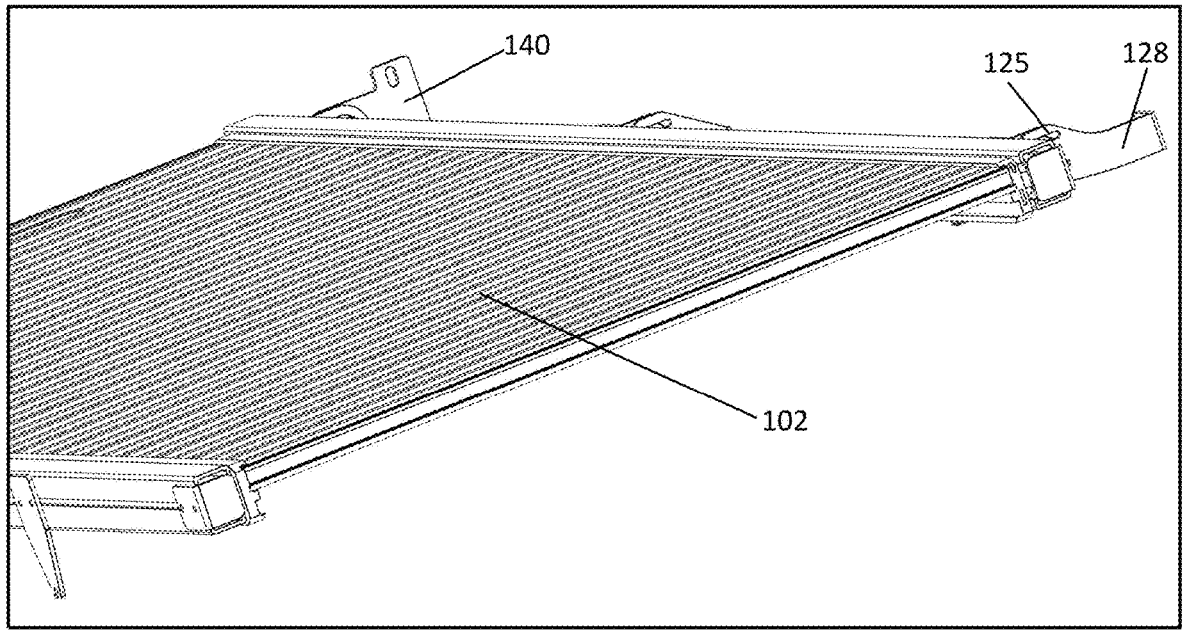
FIG. 10 is another close-up partial perspective view of a loading ramp for a van in a stowed state in accordance with certain aspects of the invention.
Figure 11:
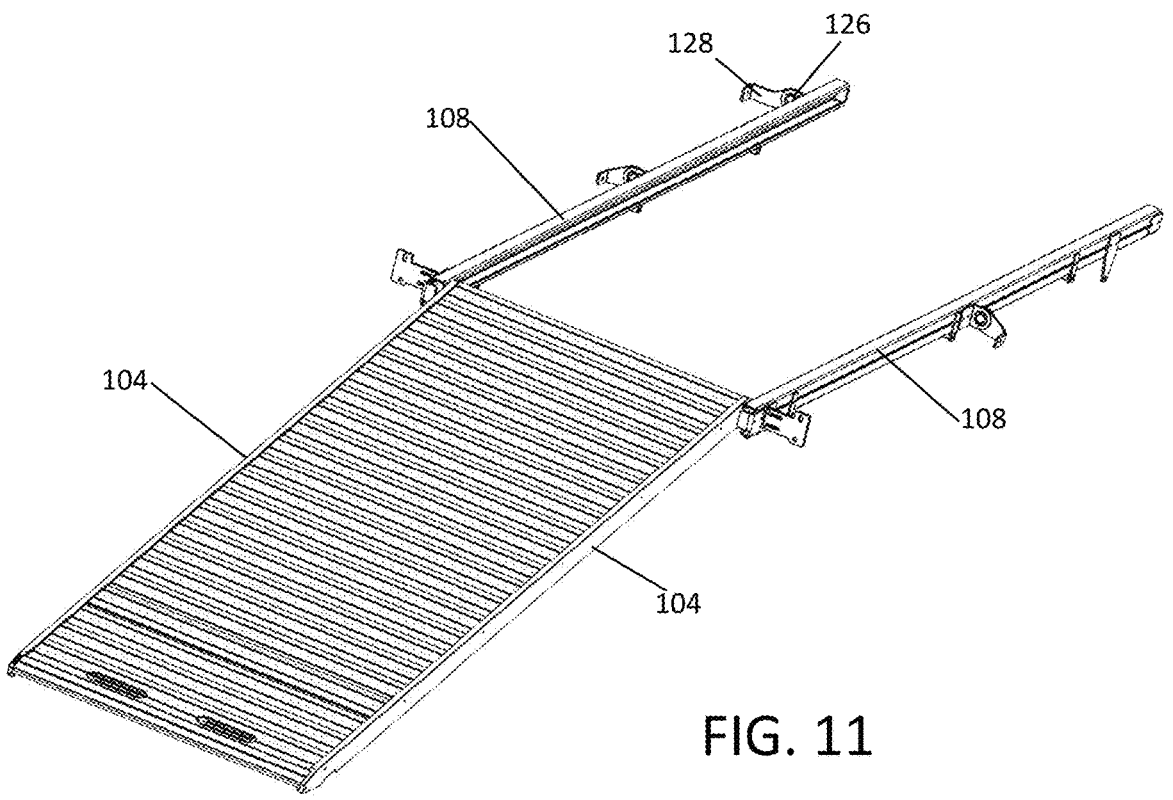
FIG. 11 is a perspective view of a loading ramp for a van in a deployed state in accordance with certain aspects of the invention.
Figure 12:
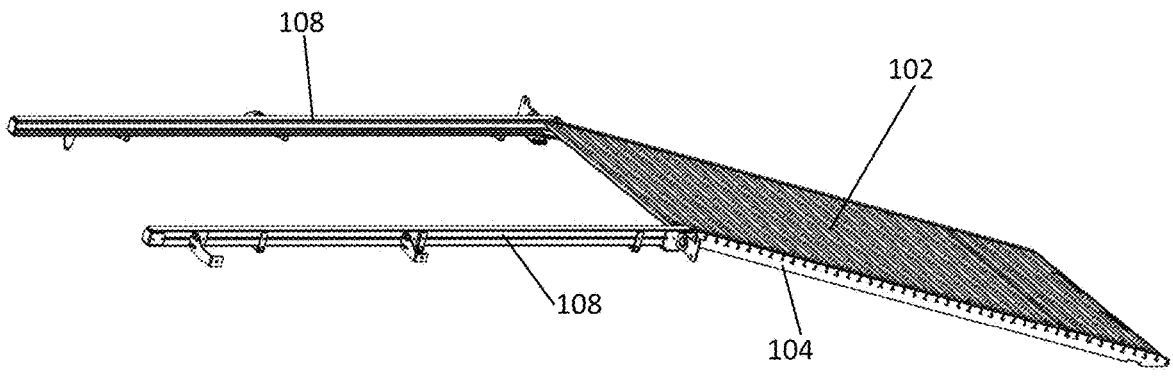
FIG. 12 is another perspective view of a loading ramp for a van in a deployed state in accordance with certain aspects of the invention.
Figure 13:
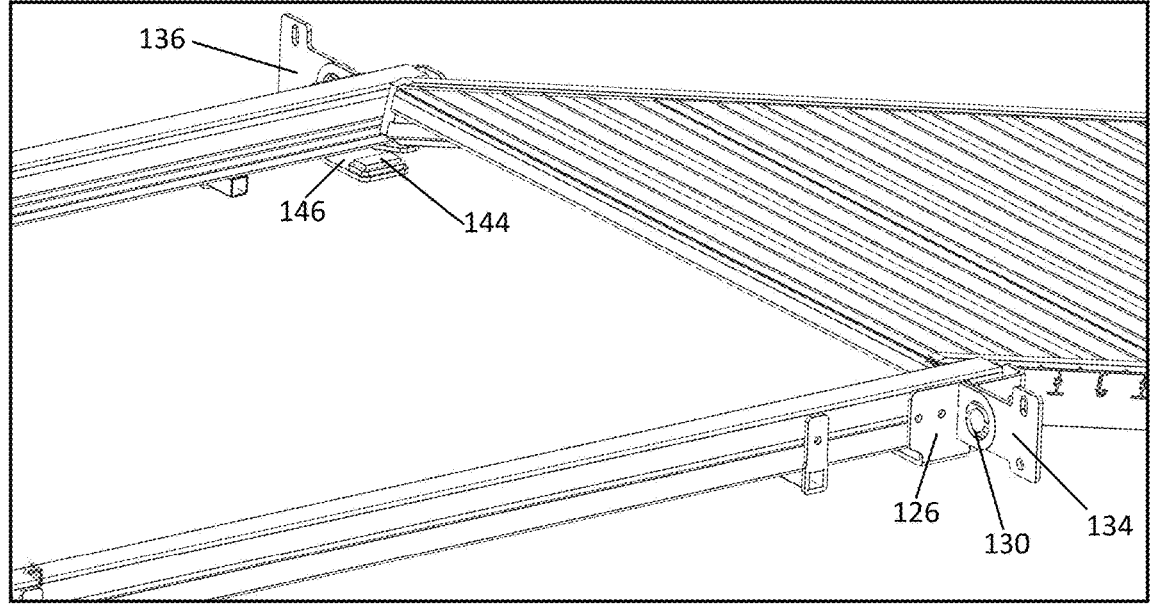
FIG. 13 is a close-up partial perspective view of a loading ramp for a van in a deployed state in accordance with certain aspects of the invention.
Figure 14:
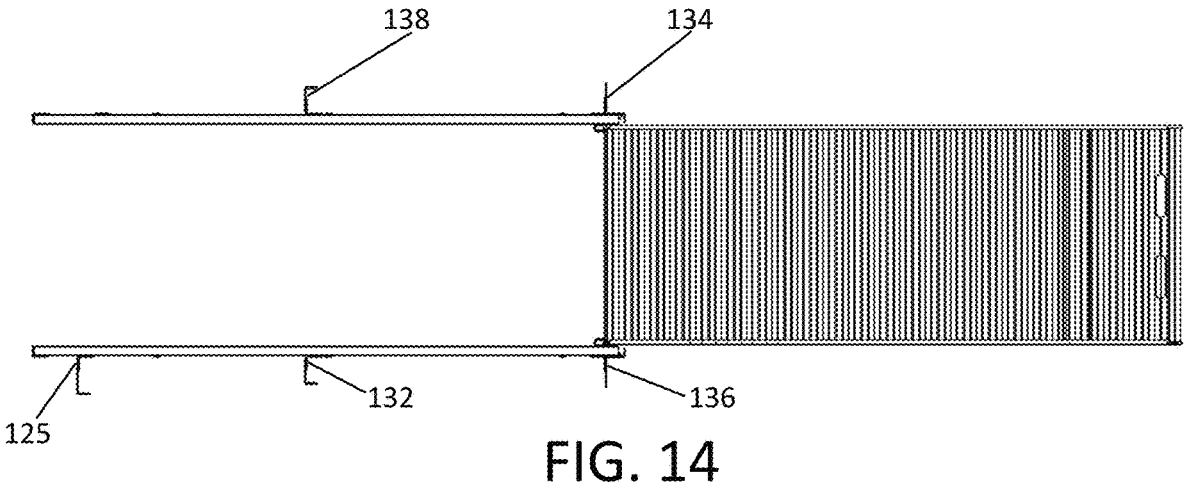
FIG. 14 is a top view of a loading ramp for a van in a deployed state in accordance with certain aspects of the invention.
Figure 15:
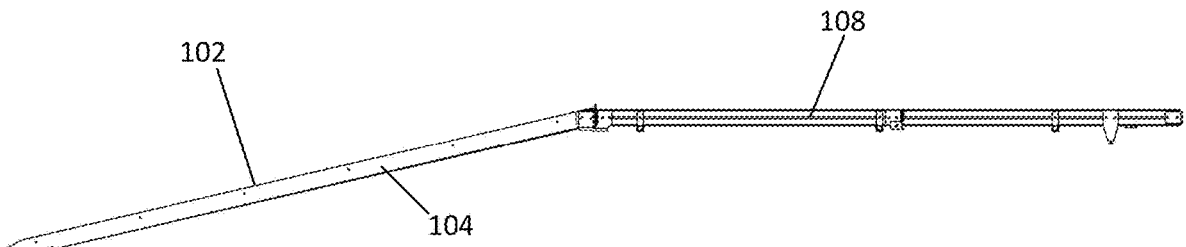
FIG. 15 is a side view of a loading ramp for a van in a deployed state in accordance with certain aspects of the invention.
Figure 16:
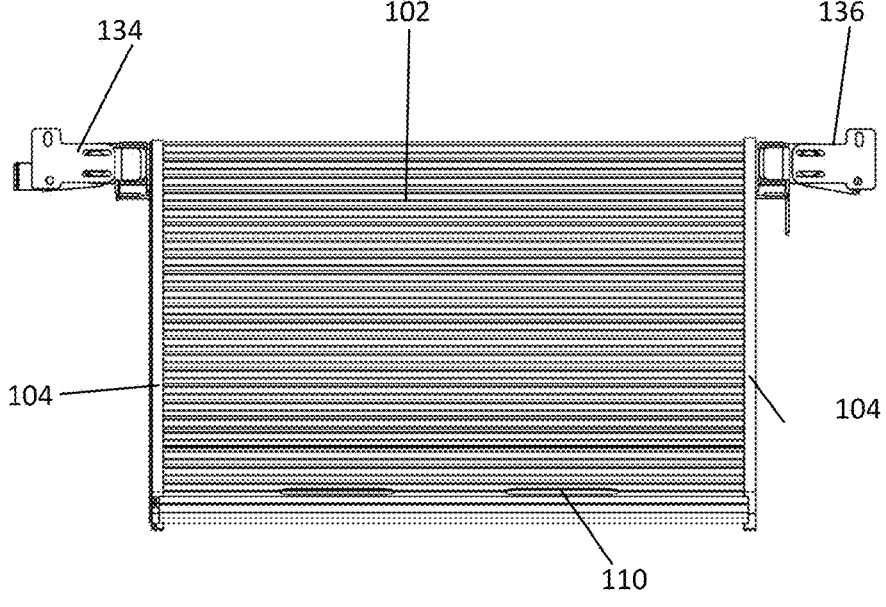
FIG. 16 is an end view of a loading ramp for a van in a deployed state in accordance with certain aspects of the invention.

In the following descriptions, the present invention will be explained with reference to various example embodiments; nevertheless, these embodiments are not intended to limit the present invention to any specific example, environment, application, or particular implementation described herein. Therefore, descriptions of these example embodiments are only provided for purpose of illustration rather than to limit the present invention. The invention is to cover all modifications, equivalents, and alternatives falling within the scope of the invention as defined by the appended claims.

The various features or aspects discussed herein can also be combined in additional combinations and embodiments, whether or not explicitly discussed herein, without departing from the scope of the invention.

Referring generally to FIGS. 1-10, the loading ramp 100 is shown in a retracted state. FIGS. 11-16 depict the loading ramp 100 in a deployed state. Additional details of certain embodiments, including mounting in a utility van, are depicted in FIGS. 17-31. The loading ramp 100 is configured to be mounted inside of a utility van in a retracted state such that the rear doors of the van can be closed normally. Then, when the doors are opened, the ramp can be moved to the deployed position by the user pulling the ramp in a distal direction (away from the van) and tilted down so that the distal end rests on the ground. The user can then easily enter and exit the van, including loading and unloading machinery via the ramp. The ramp can then be tilted or pivoted up and slid back proximally (towards the van) to the stowed position and the doors closed.

The loading ramp assembly 100 generally comprises a main deck 102, side rails 104, a transition deck 106, guide rails 108 and a plurality of mounting brackets.

The main deck 102 is an elongated rectangular planar surface. A pair of apertures 110 are defined therein for hand grabs 110 and located adjacent to the distal end. The hand grabs facilitate the user grasping the distal end of the main deck 102 to deploy and stow the main deck 102. The main deck also includes a plurality of perpendicularly-oriented ribs 112 raised above the top surface of the main deck. The ribs 112 are slightly raised and oriented perpendicular to the direction of travel in order to provide traction for the user and machinery when ascending or descending the main deck 102.

Figure 20:
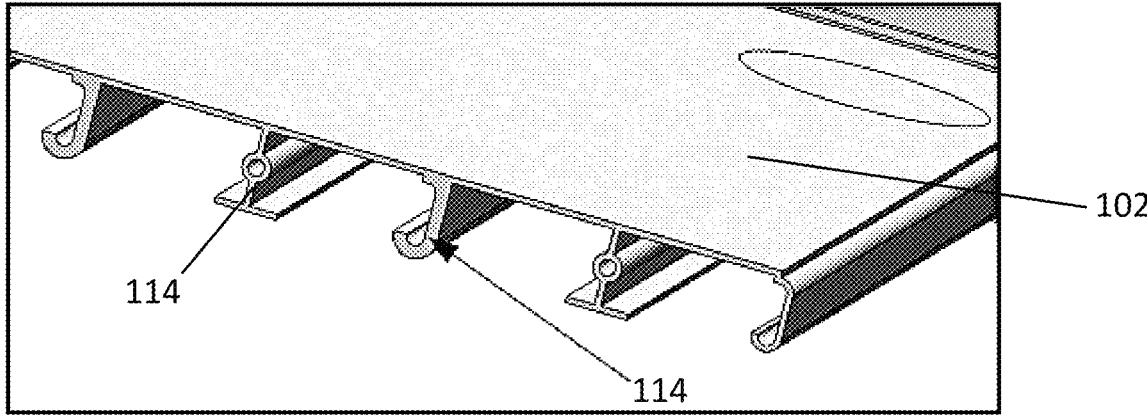
FIG. 20 is a close-up partial perspective view of a portion of a loading ramp for a van in accordance with certain aspects of the invention.
Figure 21:
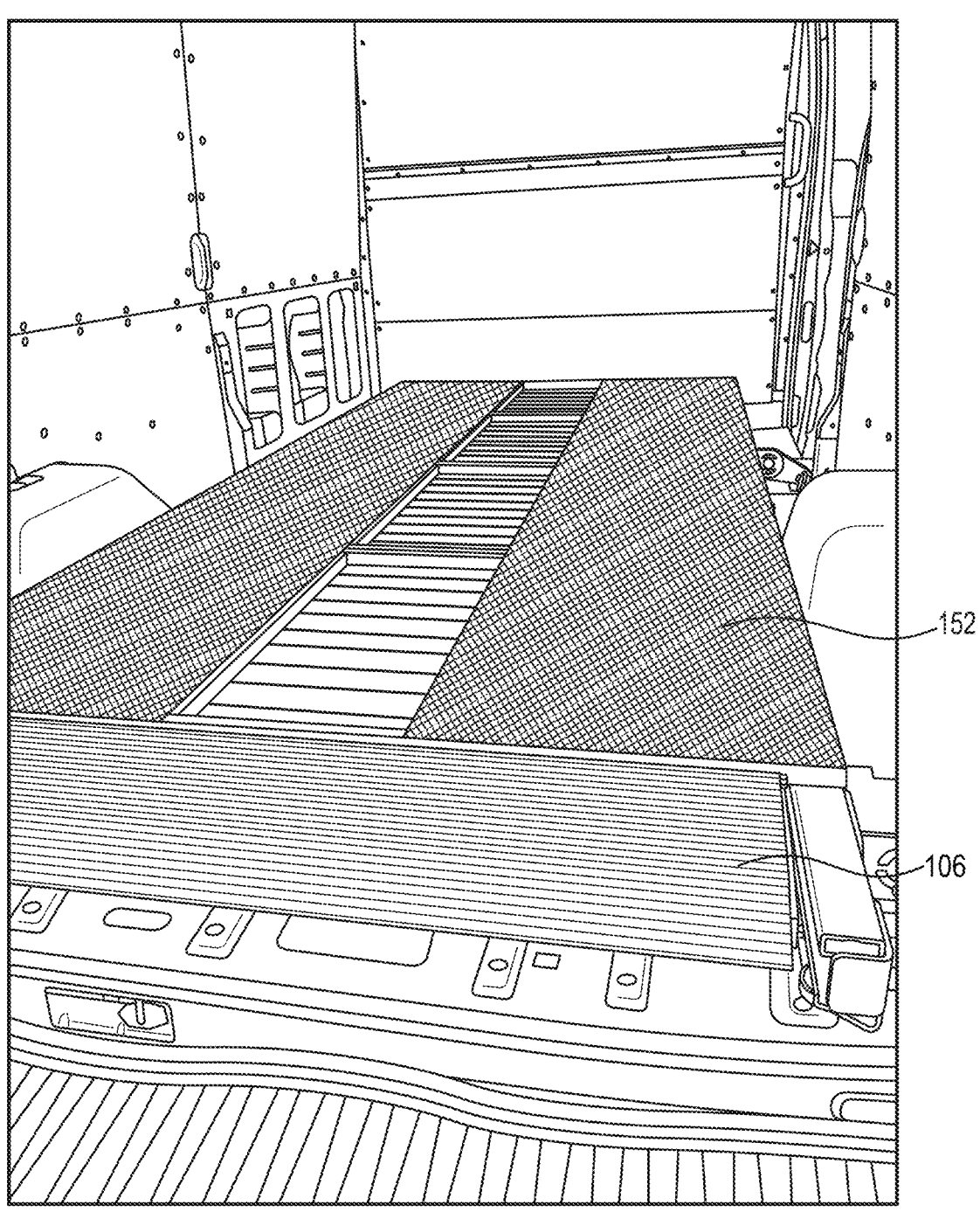
FIG. 21 is a perspective view of a loading ramp installed in a van in accordance with certain aspects of the invention.
Figure 22:
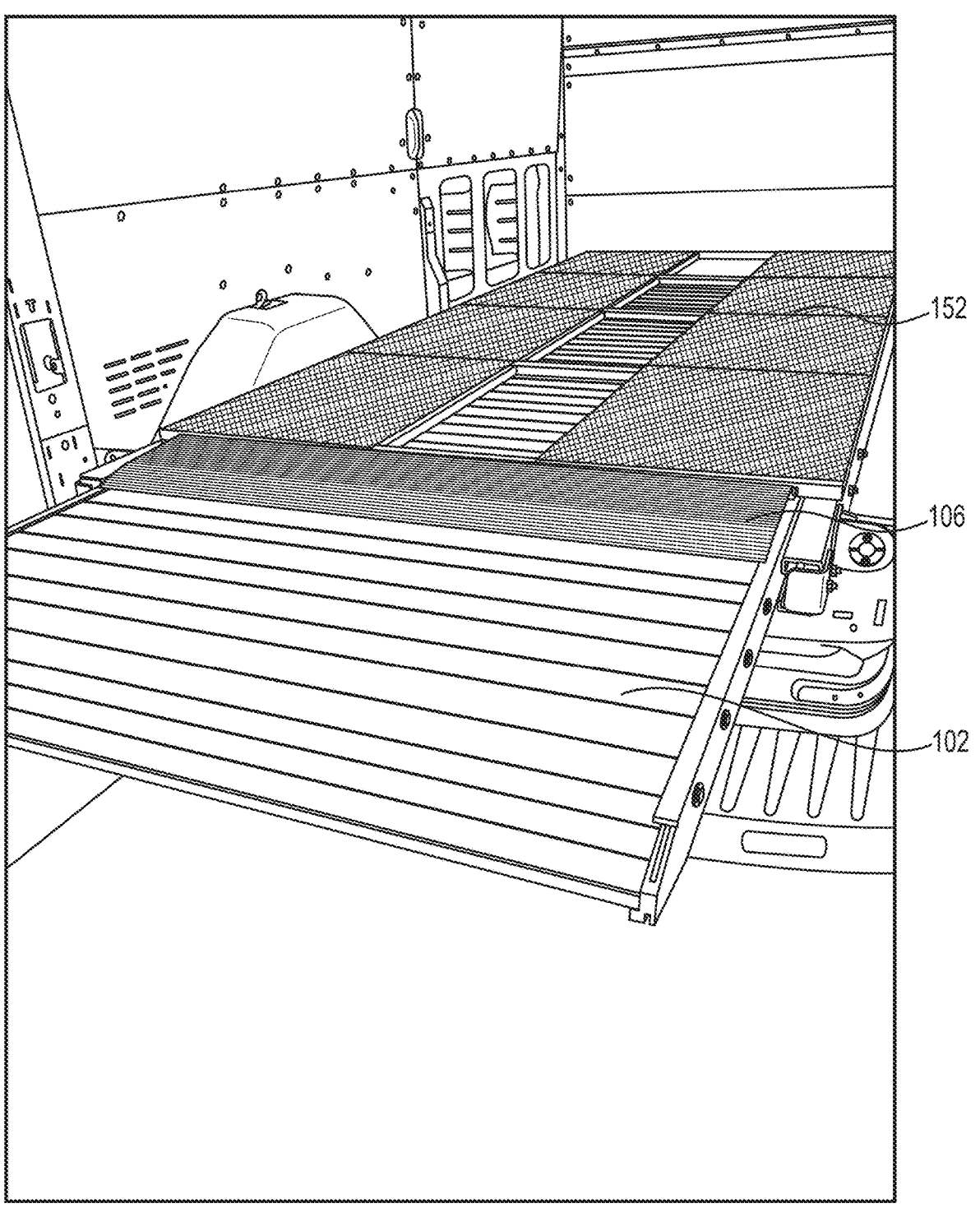
FIG. 22 is a perspective view of a loading ramp installed in a van in accordance with certain aspects of the invention.
Figure 23:
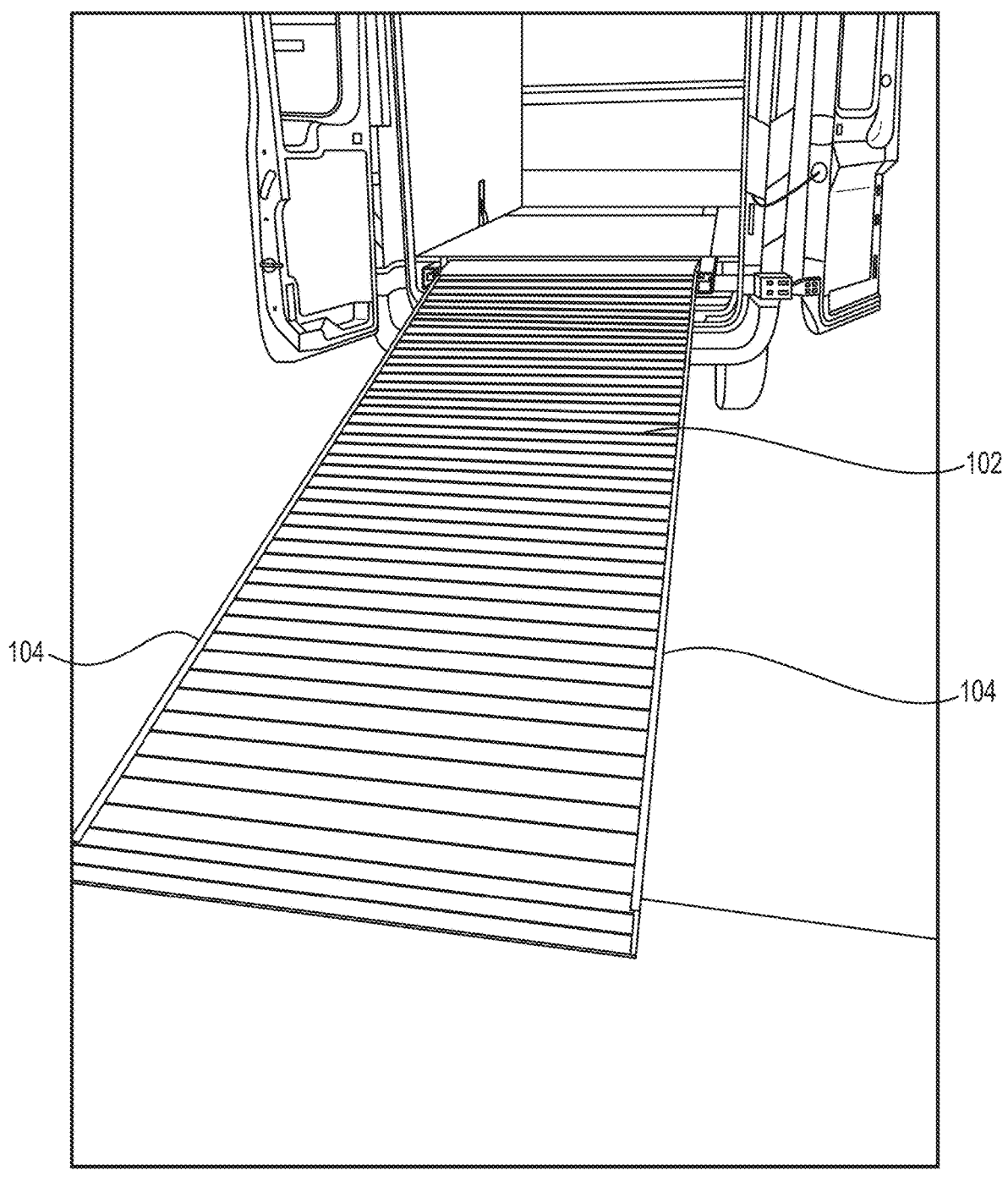
FIG. 23 is a perspective view of a loading ramp installed in a van in accordance with certain aspects of the invention.

Referring in particular to FIG. 20, a plurality of reinforcement ribs 114 are provided to the bottom surface of the main deck 102 to increase the bending resistance and torsion resistance of the main deck 102.

The main deck 102 can be formed as a singular monolithic part or it can be formed from a plurality of planks or segments that are fastened together, such as by welding or mechanical fasteners.

The ramp main deck 102 can have a solid upper surface as shown, or the surface can be a mesh or can include a plurality of small apertures. Traction aides, such as traction tape or rubber patches can be added atop the ramp deck 102 if desired.

Figure 17:
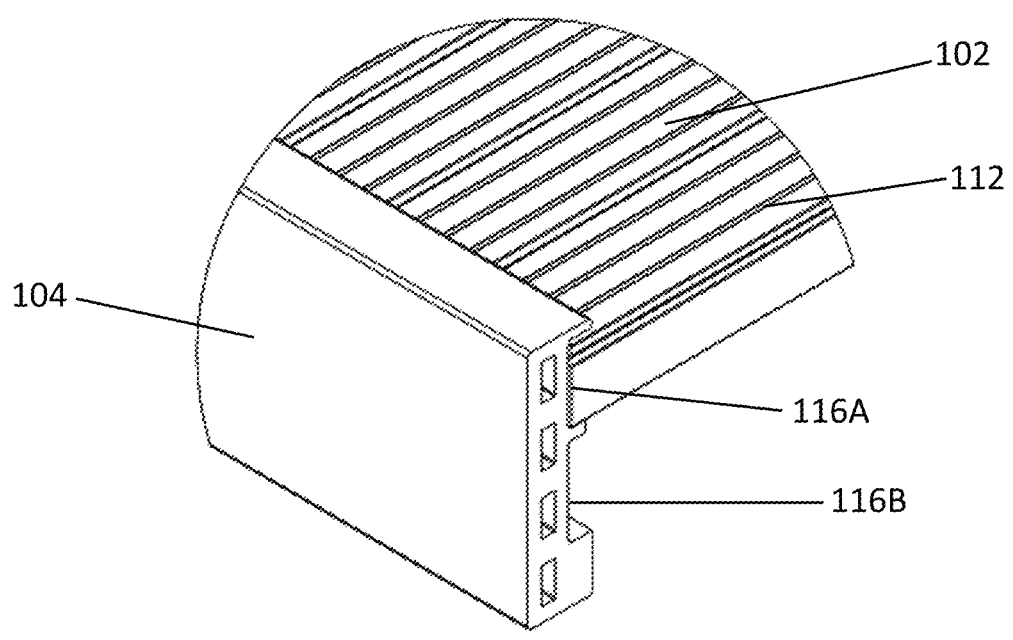
FIG. 17 is a close-up partial perspective view of a portion of a loading ramp for a van in accordance with certain aspects of the invention.
Figure 19:
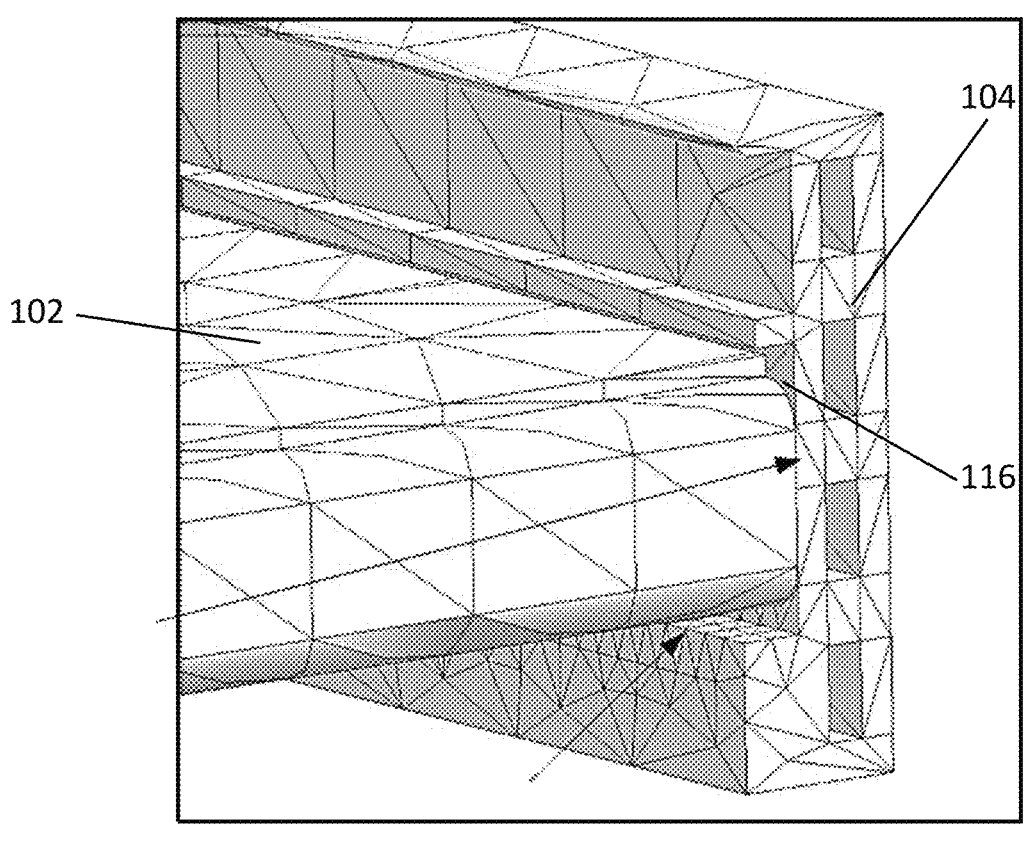
FIG. 19 is another close-up partial perspective view of a portion of a loading ramp for a van in accordance with certain aspects of the invention.

A side rail 104 is fastened to each longitudinal side of the main deck 102. Referring in particular to FIGS. 17 and 19, each side rail 104 defines one or more channels 116 facing the main deck 102 in order to mate with the longitudinal sides of the main deck 102. The side rails 104 provide additional strength to the main deck 102 to resist bending and torsional forces. The side rails 104 can be secured to the main deck 102 via a plurality of mechanical fasteners, or via other joining means such as welding.

Each side rail 104 can include an upper channel 116A and a lower channel 116B. The choice of which side rail 104 to use can be based upon the desired step up height of the front edge of the ramp 102 at the floor in the deployed position. The side rails 104 can also have a single channel, they can be flat without channels and be fastened to the longitudinal sides of the ramp.

A pair of spaced-apart guide rails 108 are disposed within the van and secured in place with brackets. The guide rails extend parallel to the side rails 104 and are placed adjacent to and just laterally outside of each respective of each respective side rail 104. The guide rails 108 guide the ramp 102 as it transitions between the retracted and deployed positions. The guide rails 108 also define mounting points for securing the loading ramp assembly 100 to the van's loading floor 118 via brackets.

Figure 31:
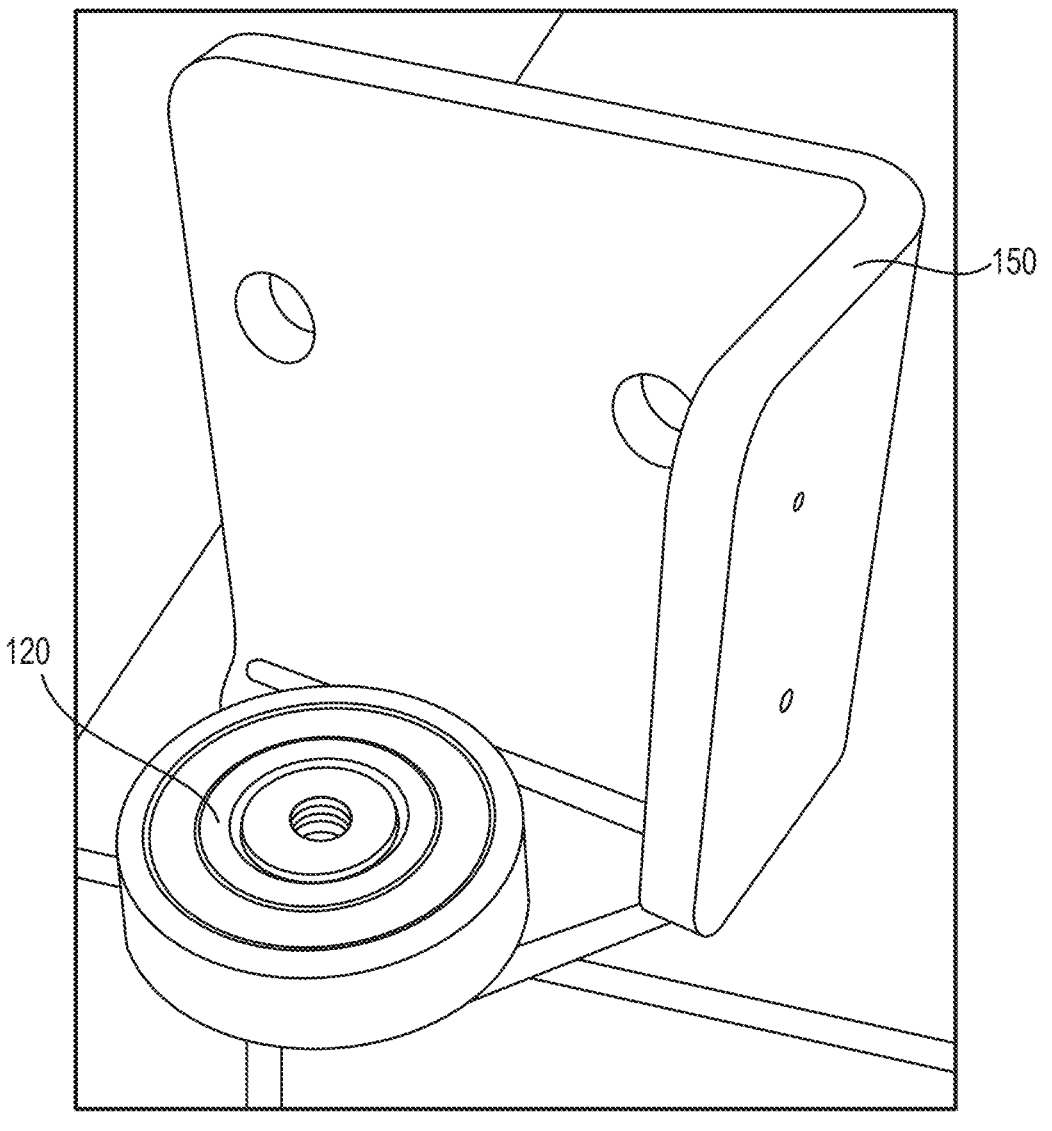
FIG. 31 is a partial perspective view of a bearing guide for a loading ramp for a van in accordance with certain aspects of the invention.

A guide wheel 120 is provided to each side rail 104 and located adjacent to the upper (proximal) end thereof so that the guide wheel 120 extends laterally outwardly away from the main deck 102. Each guide wheel 120 is mounted on an axle and oriented so that the wheel 120 rolls proximally and distally within the guide rails 108 as the ramp 100 is deployed and retracted. The guide wheels can be provided via a guide wheel bracket 150, such as shown in FIG. 31, that is fastened to the proximal end of each respective side rail 104.

Figure 18:
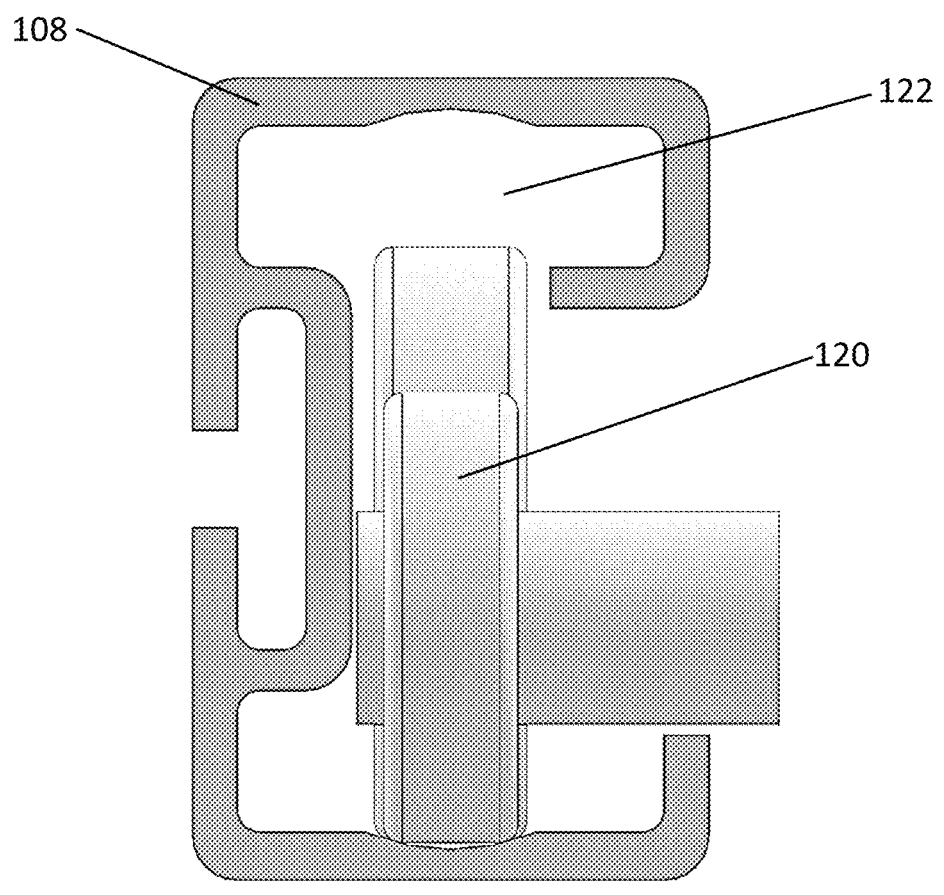
FIG. 18 is a partial end cross-sectional view of a portion of a loading ramp for a van in accordance with certain aspects of the invention.

Referring in particular to FIG. 18, each guide rail 108 defines a channel 122 in which a guide wheel(s) 120 can be confined to travel. The channel 122 is open toward the longitudinal edges of the main ramp 102 so that a wheel's axle can move through the channel 122.

A distal travel stop bracket 124 is fastened to a distal end of each guide rail 108. The travel stop bracket 124 prevents the guide wheels 120 from extending distally out of the channel 122 of the guide rails 108. The bracket in alternative embodiments can be in the form of a bolt placed through an end of the guide rail to limit travel of the wheel 120. Stop brackets 124 can also be placed over the proximal ends of the guide rails to prevent the ramp deck 102 from moving too far forward such that the wheels 120 exit proximally from the guide rails 108.

The guide rails 108 are fastened to the van with a plurality of brackets. These brackets can be secured to the van with common mechanical fasteners, or the brackets can be of a "no drill" variety that utilize existing fastening points of the van so that the loading ramp assembly 100 can be fastened to the van or vehicle without requiring any drilling through the van floor or walls. In particular, on the driver's side (typically the left side of the van in the United States), a driver's proximal mount bracket 124 is provided.

The driver's proximal mount bracket 125 comprises an inner L-shaped portion 126 fastened to the outer side of the guide rail 108 and an outer L-shaped portion 128 that fastens to the inner L-shaped portion 126. A plurality of fastener slots 130 are defined in each respective L-shaped portion 126, 128 where the portions overlap so that the lateral reach of the driver's proximal mount bracket 124 is adjustable. The slots 130 in one of the L-shaped portions 126, 128 can be arcuate so that the angle of said bracket can be adjusted to accommodate angled mounting surfaces such as the van walls. Mechanical fasteners, such as bolts and nuts, are used to secure the respective bracket portions 126, 128 together.

Additional brackets can be provided at the driver's midpoint 132, adjacent the driver's distal end 134, adjacent the passenger's distal end 136 and at the passenger's midpoint 138.

Figure 28:
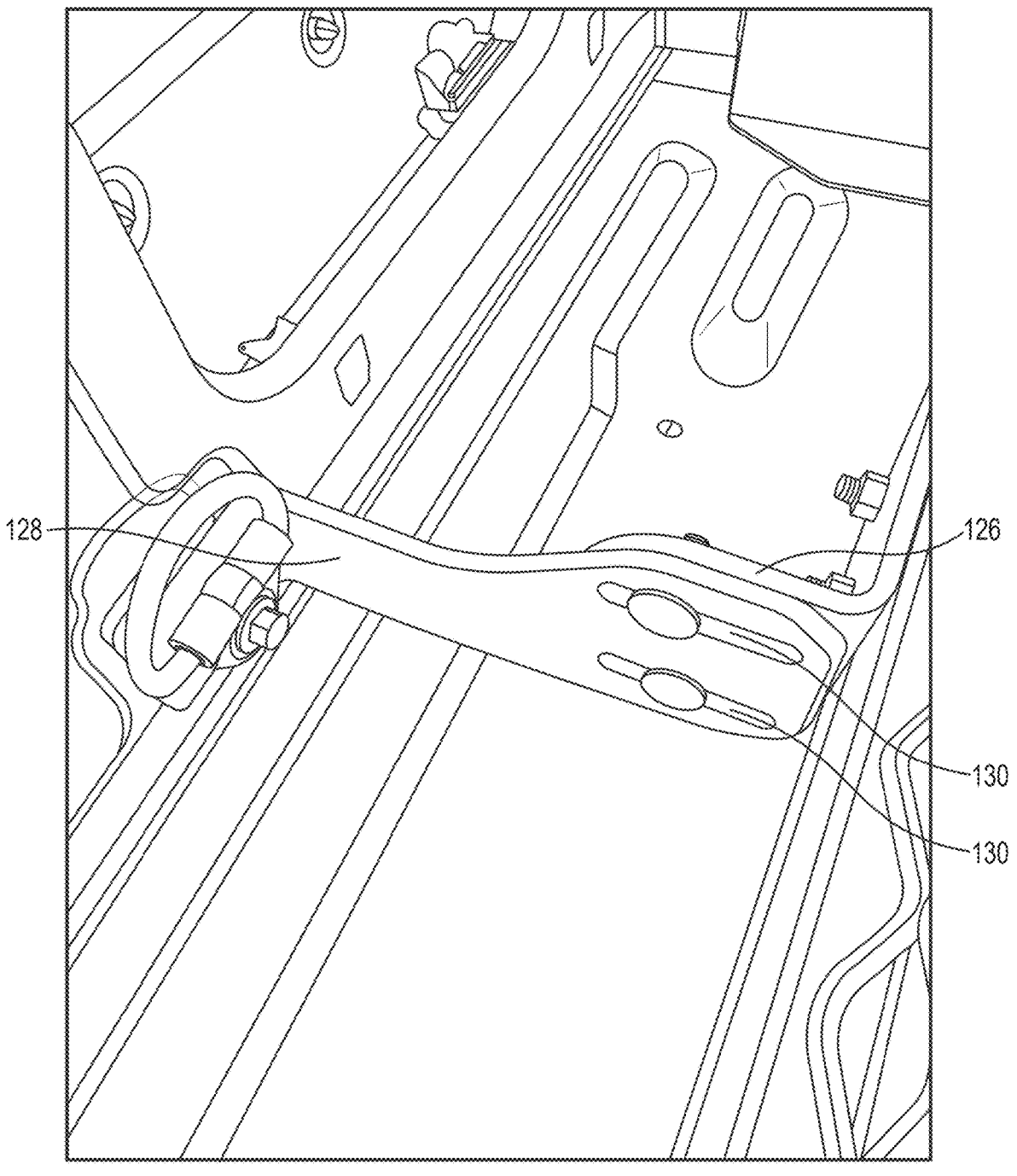
FIG. 28 is a partial perspective view of a loading ramp installed in a van in accordance with certain aspects of the invention.
Figure 29:
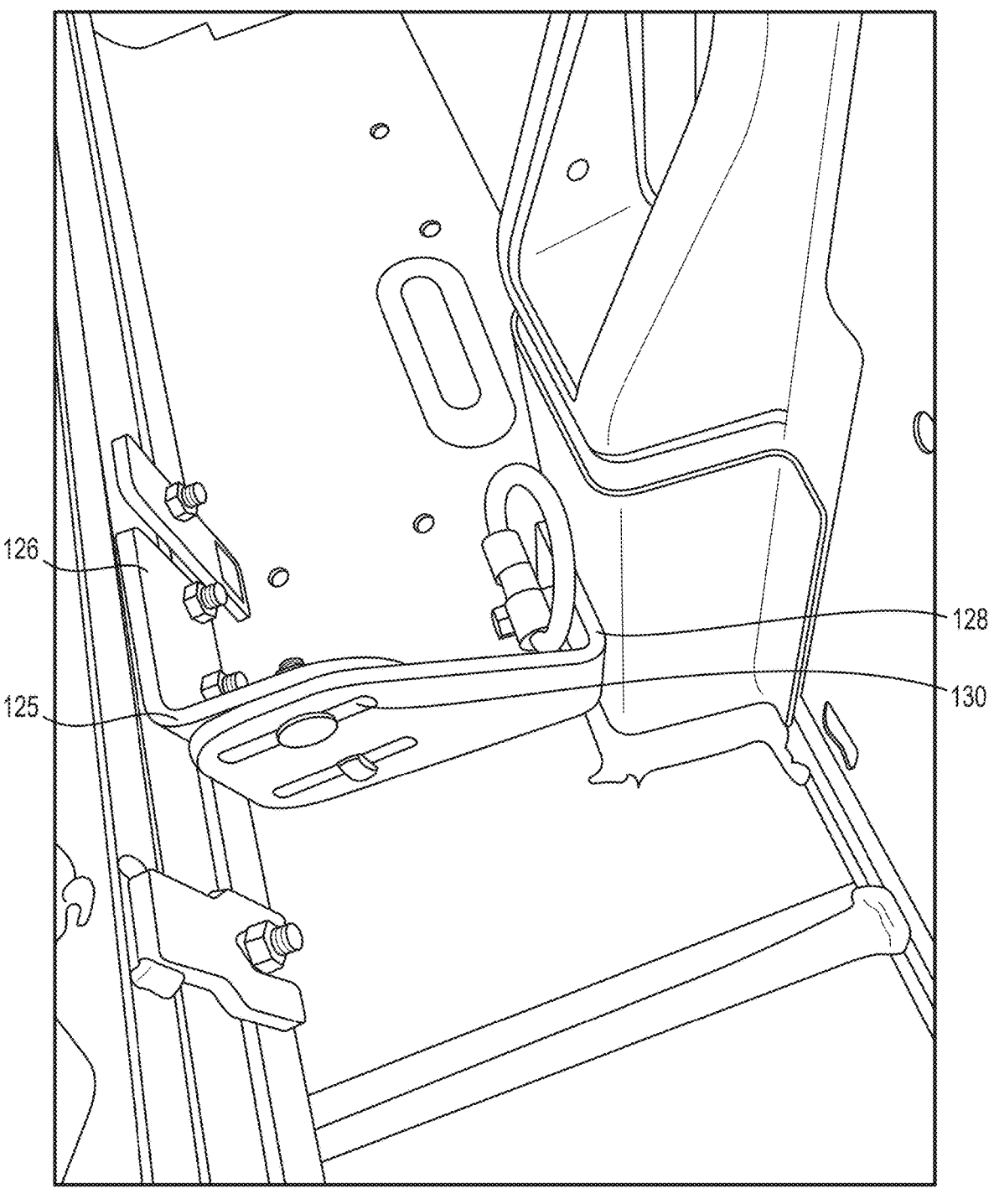
FIG. 29 is a partial perspective view of a loading ramp installed in a van in accordance with certain aspects of the invention.

The outer L-shaped portion 128 presents a planar surface that can abut flat against the van wall or other structure parallel to the guide rail 108 such as shown in FIGS. 28 and 29.

Figure 30:
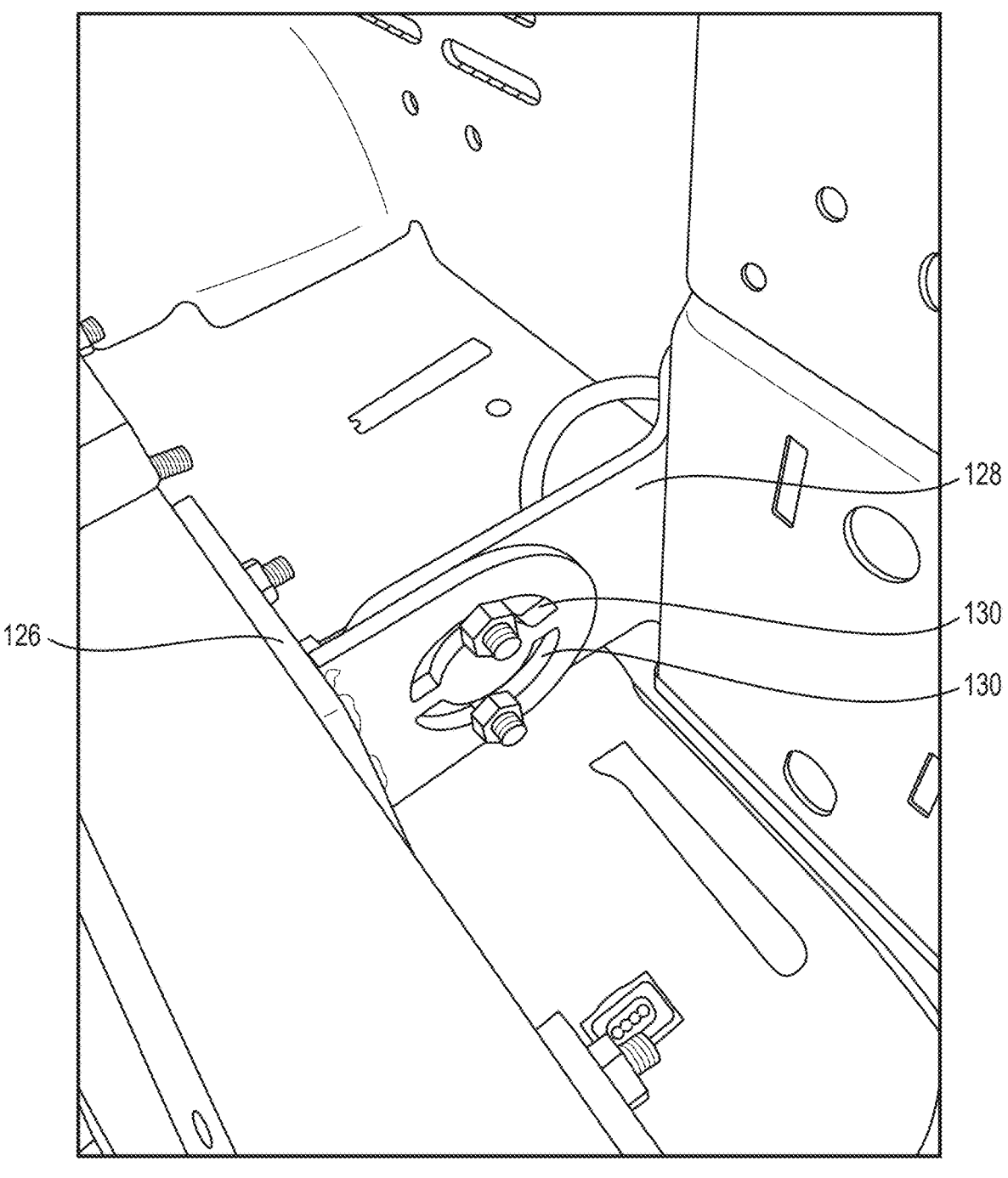
FIG. 30 is a partial perspective view of a loading ramp installed in a van in accordance with certain aspects of the invention.

However, if the mounting surface is oriented perpendicular to the frame rails, then the outer portion of the bracket can be in the form of a planar portion 140. This configuration, such as shown in FIG. 30, presents a flat surface that can abut a door frame surface or other surface that is oriented perpendicular to the guide rails 108.

In the embodiment depicted in FIGS. 1-16, the driver's proximal bracket 124, the driver's midpoint bracket 132 and the passenger's midpoint bracket 138 each utilize an outer L-shaped bracket portion 128. The driver distal end bracket 134 and the passenger distal end bracket 136 each utilize the flat bracket portion 140. Of course, the particular arrangement of brackets used to secure the ramp assembly 100 to the van can be varied to suit the internal configuration of a given van.

Figure 27:
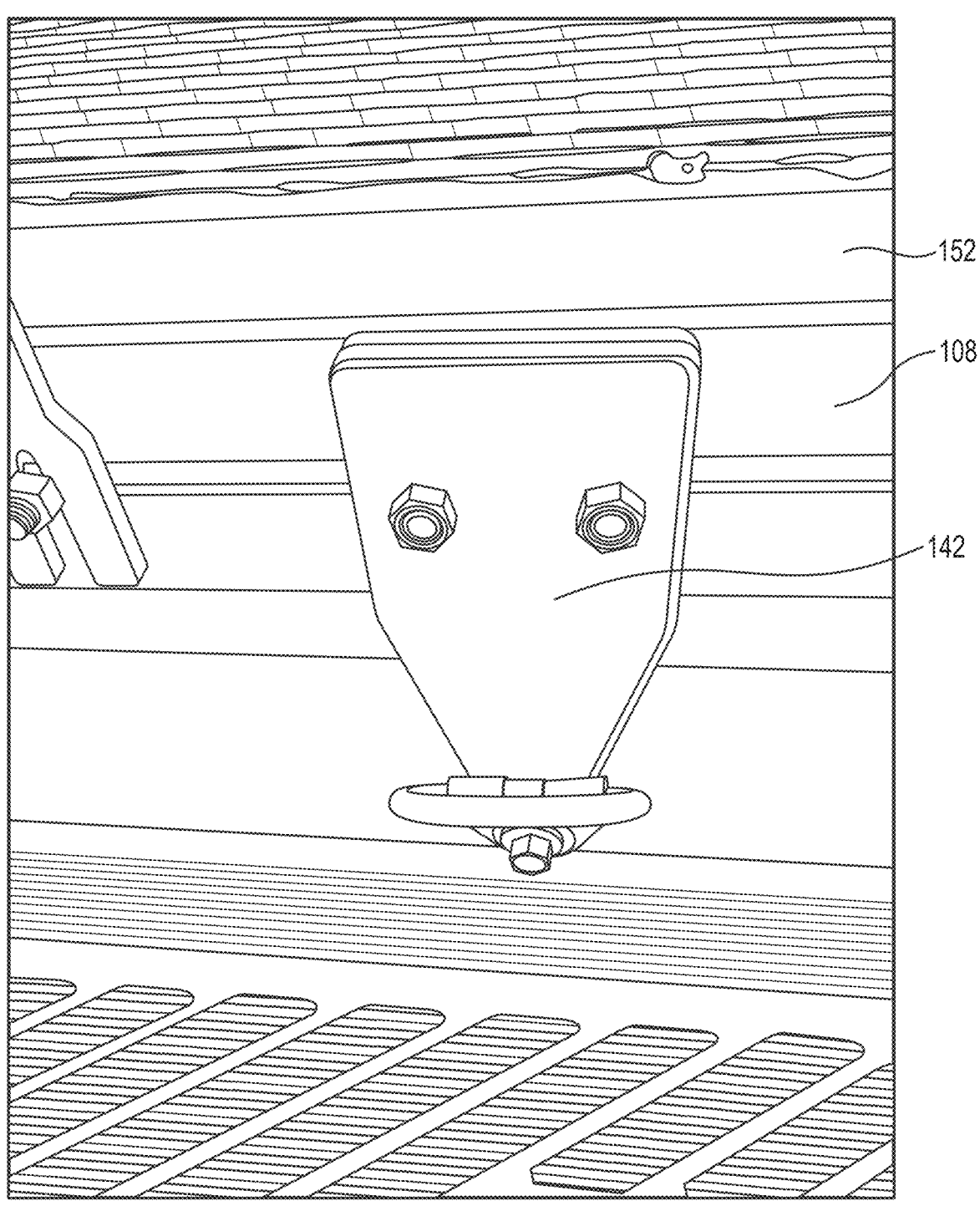
FIG. 27 is a partial perspective view of a loading ramp installed in a van in accordance with certain aspects of the invention.

An additional bracket can be provided in the step well of the van adjacent to the side sliding door. This step well bracket 142 is a planar body that spans between the passenger side guide rail 108 and the inner vertical surface of the step well of the van. As shown in the detail of FIG. 27, fasteners can be used to secure the step well bracket 142 to the respective guide rail 108 and step well structures. A similar bracket can be provided on the driver's side for vans that have driver-side sliding doors and step wells.

In order to prevent wear on the floor of the van and the bottom of the side rails 104 resulting from deploying and stowing the ramp deck 102, a slider pad 144 can be provided adjacent to the distal end of each guide rail 108 on an inner side thereof. This slider pad 144 can be seen, for example, in FIG. 13. Each inner L-shaped bracket portion 126 of the driver and passenger distal brackets 134, 136 has a slider extension portion 146 that extends horizontally inward from the guide rail 108 such that the slider pad 144 can be disposed atop the extension portion 146 at a location below the side rail 104 adjacent to the guide rail 108. Thus, the side rails 104 will slide across the slider pads 144 as the main deck 102 is moved distally and proximally relative to the guide rails 108. Additional slider pads can be provided at other points along the guide rails 108 as well.

The slider pads 144 can be formed of a smooth plastic material. The slider pads also serve to minimize metal-metal contact that can cause rattling while the van is in motion.

An elevated loading floor 152 can be provided vertically atop the guide rails 108, such as shown in FIGS. 21-27. The main deck 102 then retracts into a pocket or enclosure defined by the van's original load floor, the elevated loading floor 152 and the opposing guide rails 108.

The elevated loading floor 152 or deck can be formed of one or more rigid panels that are fastened to the guide rails 108. The elevated loading floor 152 can be a solid panel or it can be diamond treaded or have other aperture patterns defined therethrough. In another embodiment, a plurality of cross members can span between the opposing guide trails 108 and a less rigid elevated loading floor 152, such as plywood, can be fastened atop the cross members.

Figure 24:
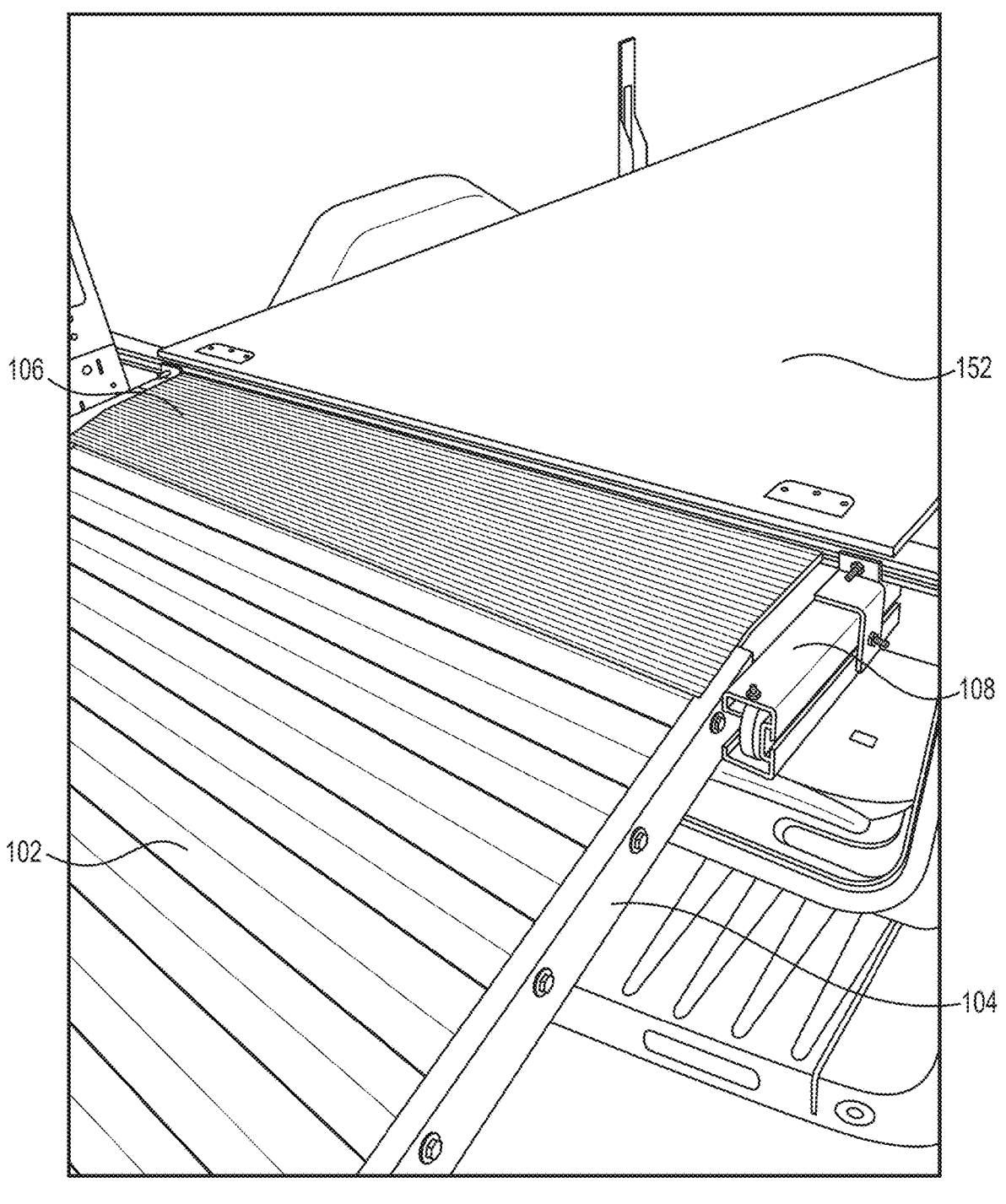
FIG. 24 is a partial perspective view of a loading ramp installed in a van in accordance with certain aspects of the invention.
Figure 25:
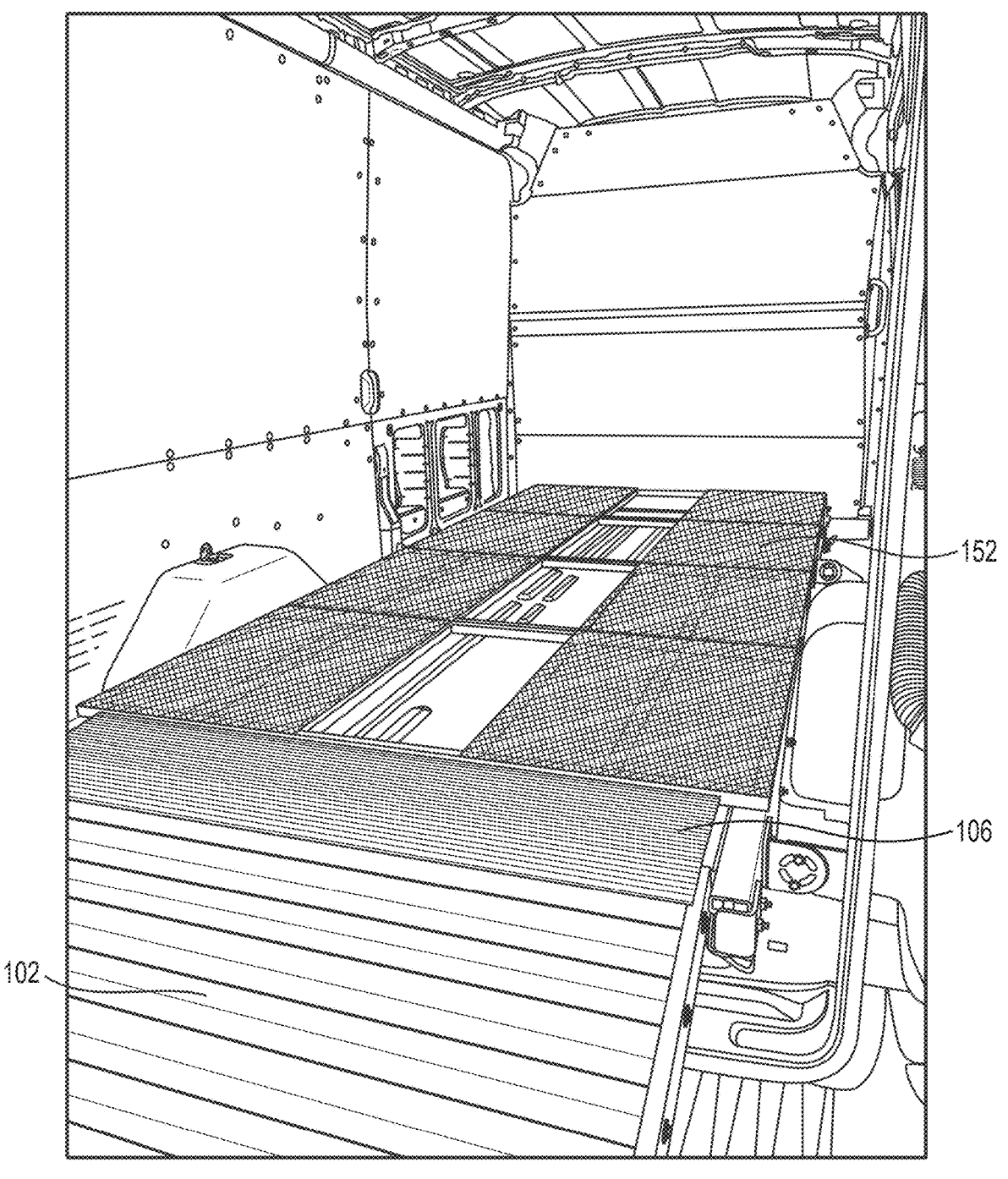
FIG. 25 is a partial perspective view of a loading ramp installed in a van in accordance with certain aspects of the invention.
Figure 26:
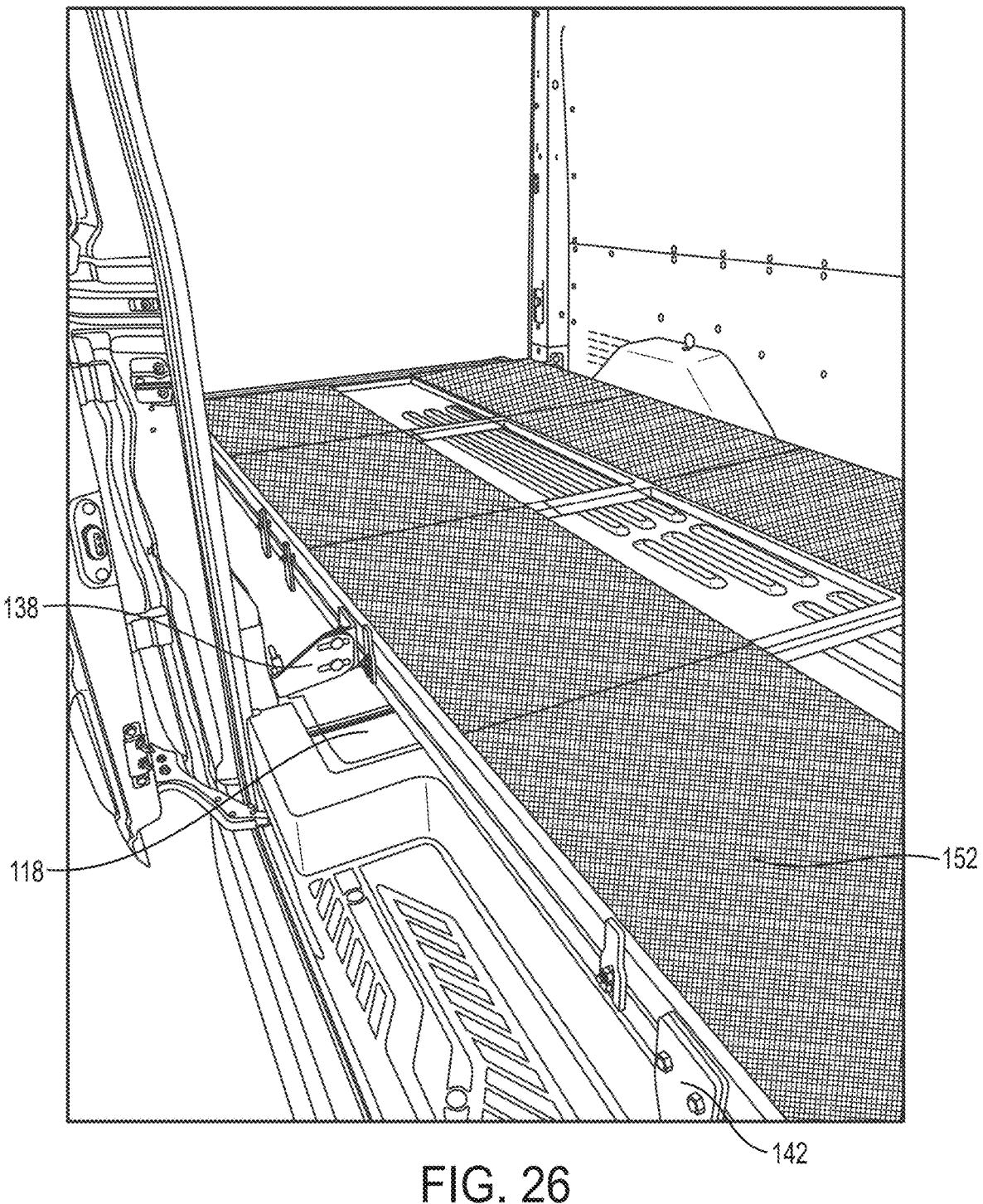
FIG. 26 is a partial perspective view of a loading ramp installed in a van in accordance with certain aspects of the invention.

The transition deck portion 106 can be provided at a proximal end of the main deck 102 such as shown in FIGS. 24-25. The transition deck portion 106 provides a covered transition between the proximal edge of the main deck 102 (when deployed) and the elevated loading floor 152 inside of the van. The transition portion 106 on a distal edge is secured to the proximal edge of the main deck 102. The opposing proximal edge of the transition portion 106 is unattached so that it can either abut the distal edge of the elevated loading floor 152 or ride atop the distal end of the elevated loading floor 152. The transition portion 106 is angled or curved to accomplish this purpose. The transition portion 106 allows wheeled items being loaded into the van to smoothly transition from the main deck 102 to the elevated loading floor 152 without the risk of becoming stuck in a gap between the main deck 102 and the elevated loading floor 152.

The transition portion 106 is curved sufficient that when the main deck's 102 distal end is raised for retraction into the van, the transition portion 106 clears under the elevated loading floor 152 so that it need not be removed before retracting the main deck into the stowed position in the van.

One or more storage compartments can be defined in the elevated loading floor 152 in portions where clearance is not needed for retraction of the main deck 102. Access doors in the elevated loading floor 152 can be defined for accessing the storage compartments. Locks can be provided to the access doors if desired.

In use, starting from the retracted position, the user grasps the distal end of the main deck 102, such as via the hand grabs 110, and pulls away from the van (distal direction). The wheels 120 move through the guide rails 108 and the side rails 104 slide atop the slider pads 144 as the user pulls until the wheels 120 contact the distal stop brackets 124. The user then pivots the main deck 102 downward until the distal end rests atop the ground. Then the user can load/unload the van as desired.

To retract the main deck 102 into the stowed position, the user lifts the distal end of the main deck so that it is approximately horizontally oriented and pushes toward the van (proximal direction). As the user does this, the main deck 102 slides proximally into the ramp storage pocket cavity inside of the van. The user keeps pushing until the wheels 120 contact the forward stop brackets 124. The retraction of the ramp 102 is sufficient that the rear doors of the van can be fully closed in the normal manner without modifications.

The main deck 102, side rails 104, a transition deck 106, guide rails 108 and guide wheels 120 can each be formed from a metal alloy (e.g., steel or aluminum alloy). However, other suitable materials can be selected for one or more of the components if desired.

While the invention has been described in connection with what is presently considered to be the most practical and preferred example embodiments, it will be apparent to those of ordinary skill in the art that the invention is not to be limited to the disclosed example embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A loading ramp assembly for a utility van, comprising:
   a main deck, wherein the main deck comprises a longitudinally elongated surface having a distal end, an opposing proximal end, and a pair of opposing longitudinal sides spanning between the proximal end and the distal end;
   a pair of side rails oriented parallel to one another, each of the side rails coupled to a respective one of the pair of opposing longitudinal sides of the main deck, each side rail having a proximal longitudinal end and a distal longitudinal end;
   a pair of guide wheels, each of the guide wheels is coupled to a respective one of the pair or side rails adjacent to the proximal end thereof, and each of the guide wheels extends laterally outwardly from the respective one of the pair or side rails to which each of the pair of guide wheels is coupled;
   a pair of guide rails oriented parallel to one another and parallel to the pair of side rails, each of the pair of guide rails defining a channel with an opening in one longitudinal side of the guide rail, the channel spanning between a proximal end thereof and an opposite distal end thereof, each of the pair of guide rails disposed adjacent to a respective one of the pair of side rails such that the channel faces towards the respective side rail, wherein each of the pair of guide wheels is shaped and sized to be disposed within the channel and travel proximally and distally within the respective guide rail;
   a first bracket fastened to one of the pair of guide rails adjacent to the opposite distal end thereof; and
   a second bracket fastened to the other one of the pair of guide rails adjacent to the opposite distal end thereof,
   wherein the first bracket and the second bracket each comprise a longitudinally inward extending portion that includes a sliding pad positioned to allow a bottom surface of a respective one of the pair of side rails to slide atop a respective one of the sliding pads when the pair of guide wheels move proximally and distally within the channels of the pair of guide rails.

2. The loading ramp assembly of claim 1, wherein the first bracket and the second bracket each comprise a laterally outwardly extending flange that defines a first plurality of apertures therethrough.

3. The loading ramp assembly of claim 2, wherein each of the first plurality of apertures defines an arcuate channel.

4. The loading ramp assembly of claim 2, wherein the first bracket and the second bracket each further comprise a laterally outwardly extending mounting portion with a second plurality of apertures defined therethrough such that a mechanical fastener can be inserted simultaneously through one of the first plurality of apertures and one of the second plurality of apertures.

5. The loading ramp assembly of claim 1, wherein the main deck is planar and defines a plurality of raised ribs that are oriented perpendicular to a longitudinal axis of the main deck.

6. The loading ramp assembly of claim 1, wherein the main deck comprises an aperture through the main deck that is located adjacent to the distal end thereof to facilitate grasping with a hand of a user.

7. The loading ramp assembly of claim 1, wherein the main deck comprises a plurality of separate segments that are joined together to define a continuous upper top deck surface.

8. The loading ramp assembly of claim 1, wherein the main deck comprises a plurality of reinforcement ribs extending downward from a lower surface thereof.

9. The loading ramp assembly of claim 1, further comprising an elevated loading floor disposed atop the pair of guide rails, the elevated loading floor spanning longitudinally from the distal end of the pair of guide rails to the proximal end of the guide rails, and laterally between the pair of guide rails.

10. The loading ramp assembly of claim 9, further comprising a transition deck portion coupled to the proximal end of the main deck, the transition deck portion extending proximally from the main deck sufficiently to bridge a gap between the proximal end of the main deck and a distal end of the elevated loading floor when the main deck is in a deployed state.

11. The loading ramp assembly of claim 10, wherein the transition deck portion is curved.

12. The loading ramp assembly of claim 1, wherein each said sliding pad is formed of a plastic material.

13. The loading ramp assembly of claim 1, further comprising a plurality of distal travel stop brackets, each of the stop brackets disposed over a respective distal end of each of the pair of guide rails, each of the travel stop brackets configured to prevent a respective one of the pair of guide wheels from exiting the channel of the respective guide rail from the opposite distal end thereof.

14. The loading ramp assembly of claim 1, further comprising a third bracket fastened to one of the pair of guide rails and located adjacent to the proximal end thereof, the third bracket comprising a first L-shaped portion that is fastened to the guide rail and a second L-shaped portion that extends laterally outward from the first L-shaped portion, wherein the second L-shaped portion presents a securing surface that is oriented parallel to a longitudinal axis of the guide rail to which the third bracket is fastened.

15. A loading ramp assembly for a utility van, comprising:
a main deck, wherein the main deck comprises a longitudinally elongated surface having a distal end, an opposing proximal end, and a pair of opposing longitudinal sides spanning between the proximal end and the distal end;
a pair of side rails oriented parallel to one another, each of the side rails coupled to a respective one of the pair of opposing longitudinal sides of the main deck, each of the side rails having a proximal longitudinal end and a distal longitudinal end;
a pair of guide wheels, each of the guide wheels is coupled to a respective one of the pair of side rails adjacent to the proximal end thereof, and each of the guide wheels extends laterally outwardly from the respective one of the pair or side rails to which each of the pair of guide wheels is coupled;
a pair of guide rails oriented parallel to one another and parallel to the pair of side rails, each of the pair of guide rails defining a channel with an opening in one longitudinal side of the guide rail, the channel spanning between a proximal end thereof and an opposite distal end thereof, each of the pair of guide rails disposed adjacent to a respective one of the pair of side rails such that the channel faces towards the respective side rail, wherein each of the pair of guide wheels is shaped and sized to be disposed within the channel and travel proximally and distally within the respective guide rail; and
an elevated loading floor disposed atop the pair of guide rails, the elevated loading floor spanning longitudinally from the opposite distal end of the pair of guide rails to the proximal end of the guide rails, and laterally between the pair of guide rails.

16. The loading ramp assembly of claim 15, further comprising a transition deck portion coupled to the proximal end of the main deck, the transition deck portion extending proximally from the main deck sufficiently to bridge a gap between the proximal end of the main deck and a distal end of the elevated loading floor when the main deck is in a deployed state.

17. The loading ramp assembly of claim 16, wherein the transition deck portion is curved.

18. The loading ramp assembly of claim 15, further comprising a mounting bracket fastened to one of the pair of guide rails, the mounting bracket comprising a first L-shaped portion that is fastened to the guide rail and a second L-shaped portion that extends laterally outward from the first L-shaped portion, wherein the second L-shaped portion presents a mounting surface that is oriented parallel to a longitudinal axis of the guide rail to which the mounting bracket is fastened.

19. The loading ramp assembly of claim 18, wherein the first L-shaped portion and the second L-shaped portion each include a plurality of apertures defined through overlapping flange portions thereof such that a mechanical fastener can be inserted simultaneously through one of the plurality of apertures of the first L-shaped portion and one of the plurality of apertures in the second L-shaped portion.

20. The loading ramp assembly of claim 19, wherein each of the plurality of apertures in at least one of the first L-shaped portion and the second L-shaped portion defines an arcuate channel.

* * * * *